March 5, 1963

E. K. HOWELL 3,080,491

PHOTOELECTRIC CONTROLLER

Filed Aug. 10, 1960

Inventor:
Edward Keith Howell
by Henry P. Truesdell
His Attorney

United States Patent Office 3,080,491
Patented Mar. 5, 1963

3,080,491
PHOTOELECTRIC CONTROLLER
Edward Keith Howell, Hendersonville, N.C., assignor to General Electric Company, a corporation of New York
Filed Aug. 10, 1960, Ser. No. 48,660
9 Claims. (Cl. 307—117)

This invention relates to photoelectric controllers suitable for controlling electric systems in response to variations in light levels and especially to a photoelectric controller for automatic operation of street lighting installations.

To insure traffic safety it is essential that artificial street lighting be provided whenever natural illumination is inadequate and, to save operational costs it is important that the street lighting system be energized and deenergized at relatively low lighting levels. To this end, one of the foremost features desired in any automatic photoelectric controller for street lighting is sensitivity, that is, the ability of such a controller to respond to low light levels in the surrounding environment when darkness approaches to energize the street lights. At the same time, the controller should be responsive to equally low light levels when daylight approaches to deenergize the street lighting system.

With a high degree of sensitivity, it is equally important that the photoelectric controller be capable of withstanding momentary or transient flashes of light caused, for example, by lighting or automotive headlights, without unwanted deenergization of the street lighting system. In other words, the controller should have a built-in time delay.

With the relatively heavy load characteristics of a street lighting system, it is also important to provide a photoelectric controller having a long and maintenance free life while still remaining stable in its operation. The controller should be capable of handling heavy lighting loads repeatedly; at the same time, the light sensitive element or photocell forming part of the controller must be isolated from such loads and must have a large variation in its operating characteristics when exposed to changes in ambient light intensity, especially when such ambient light is at a relatively low light level.

These features and advantages are attained in a photoelectric controller constructed in accordance with the instant invention.

It is, therefore, an object of the invention to provide an improved type of photoelectric controller for electrical systems such as street lighting equipment.

Another object of the invention is to provide a photoelectric controller which is very sensitive to ambient illumination and which provides for stability of operation in effecting the energization and deenergization of the load, such as a lighting system.

Still another object of the invention is to provide a photoelectric controller capable of handling a heavy load while itself being operable by small power inputs such as are obtained from a light sensitive device.

A further object is to provide an improved photoelectric controller with stable operation and a time delay such that a lighting load is not flicked on and off at random.

Briefly, a photoelectric controller constructed in accordance with the invention is connected across an electrical supply line to control the energization of a load such as a street lighting system in response to the ambient illumination. The controller includes a sensitive control relay having a coil connected in series with a capacitor across the supply lines to form a resonant circuit. A light sensitive device, such as a photoconductive type photocell, is connected electrically in parallel with a portion of the resonant circuit. Small variations in the resistivity of the photocell—the resistance of the cell decreases when exposed to light and increases when darkened—changes the resonance of the circuit and especially the current flowing in the relay coil so that the relay picks up to closed position upon increase in the resistivity of the photocell when darkened. Pick up of the sensitive control relay energizes a power type relay which, in turn, is electrically connected to energize and deenergize the street lighting system.

The power relay itself is provided with a time delay mechanism giving a time lag between operation of the sensitive control relay and the power relay. This means that the lighting system will not be affected by momentary changes in the light levels to which the photocell is exposed. The arrangement is such that the sensing circuit including the photocell and sensitive control relay is electrically isolated from the load power circuits including the power relay and the sensitive relay contacts are not called upon to interrupt current at any time. This eliminates contact erosion and increases the life of the sensitive relay and the reliability of the controller.

The subject matter of the invention is particularly pointed out and distinctly claimed in the concluding portion of the specification. The invention, both as to construction and method of operation, together with further objects and advantages thereof, may best be understood by reference to the following detailed description taken in connection with the accompanying drawings in which:

Figure 1:
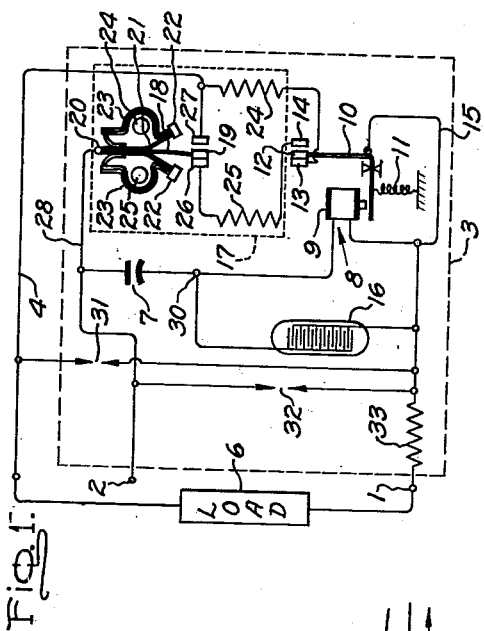
FIG. 1 is a circuit diagram of a preferred form of the photoelectric controller constructed in accordance with the invention and which illustrates the construction of one suitable form of time-delay power relay.

Referring to the drawings, FIG. 1 illustrates in schematic form the photoelectric controller connected to electric current supply lines 1 and 2 with line 1 being the neutral line. Line 2 has an alternating voltage potential of approximately 105 to 130 volts (nominally 120 volts) at a frequency of 60 cycles per second relative to line 1, the normal voltage utilized in street lighting systems. It should be understood, however, that the controller may be utilized in installations for various load functions having higher or lower voltage or different frequency sources by proper selection of components. The photoelectric controller of the invention is outlined in general by the dash lines 3 with a third conductor 4 leading from the controller to a load 6, such as a street light.

The photoelectric controller 3 is provided with a capacitor 7 and a sensitive control relay 8 having a coil 9 connected in series with the capacitor between the conductors 1 and 2 to form a resonant circuit. Relay 8 is provided with a pivoted L-shaped armature 10 biased by a spring 11 and having a contact 12 at one end for engaging either of two spaced fixed contacts 13 and 14. A conductor 15 electrically connects the armature to current supply line 1 for making an electrical connection to the normally closed contact 13. A photocell 16 is electrically connected in parallel with a portion of the aforesaid resonant circuit, in this case the control relay coil 9. This photocell may be of a resistive cadmium sulphide type, such as one manufactured by General Electric Company Cat. No. 7427. However, any suitable photoconductive cell may be used.

A heavy duty power relay indicated by dotted line 17 controls the energization of the load by opening or closing the circuit from conductor 2 through the relay 17 and through conductor 4 to the load 6. Relay 17 is of the bistable type so that it snaps to and remains in either of two positions. To this end, a snap action pre-stressed spring 18 carries a contact 19 at its outer end and its inner end 20 is fastened between spaced flexible leaf springs 21 which support the spring 18 and are themselves fastened to spaced supports 22. A bimetallic element or blade 23 is also fastened at one end to each of the supports 22 and extends around a cooperating resistance heater 24 or 25 so that the end of each blade bears against the movable end 20 of spring 18. The bimetallic blades 23 push the end 20 of spring 18 back and forth a slight amount so that the contact 19 carried by the spring snaps into engagement with either one of spaced fixed contacts 26 and 27. Once the contact 19 has been snapped into engagement with either fixed contact it remains in that position even though the actuating bimetallic blade has cooled down and returned to normal position. It requires heating and deflection of the other bimetallic blade to move contact 19 to a new position.

As illustrated by the circuit diagram of FIG. 1, movable contact 19 of the power relay is electrically connected to supply line 2 by a conductor 28. Fixed contact 27 is electrically connected to conductor 4 and one end of heater 24; fixed contact 26 is electrically connected to one end of heater 25. The other ends of heaters 24 and 25 are electrically connected to the fixed contacts 13 and 14, respectively, of the sensitive relay 8; this means that closure of either contact 13 or 14 of the sensitive relay energizes the corresponding heater to actuate power relay 17. The resistance heaters give a time delay in a manner and for purposes to be described later.

Figure 5:
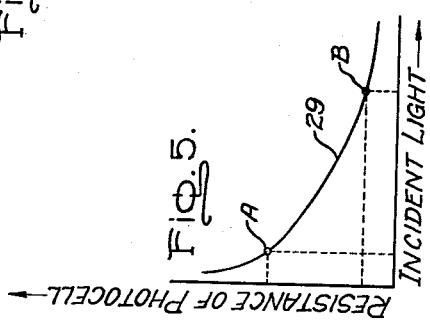
FIG. 5 illustrates the relationship between the resistance of the photocell and incident light falling on the cell.

The cooperation between the photoconductive type photocell 16 and the series resonant circuit formed by the inductive coil 9 of the relay and capacitor 7 is especially important. The circuit makes it possible to utilize certain operating characteristics of the photocell, as illustrated in FIG. 5, in designing a photoelectric controller of high sensitivity operating under small changes in low light levels. In FIG. 5, the curve 29 illustrates the relationship between the resistance of photocell 16 and the incident light level to which the cell is exposed. Under low light levels the resistance of the photocell increases markedly—in the identified photocell to several million ohms in total darkness. As the photocell is exposed to stronger light levels the resistivity decreases to very low levels and in the case of bright sunlight to 100 ohms or less. Curve 29 shows that the resistance of the photocell does not vary directly with the amount of incident light. The slope of the curve is steep in the area of point A (low light level) so that large variations in the resistance of the photocell are obtained by comparatively small changes in light intensity. By comparison, the slope of the curve flattens out in the area of point B (high light levels) so that only small variations in resistance result from large changes in light intensity. Operating in the area of point A, the photocell becomes more sensitive to small changes in light levels. The cell is operated as a high impedance device by placing it in parallel with a portion of the series resonant circuit formed by coil 9 and condenser 7. This means that small changes in light levels will operate the photoelectric controller. With the photocell operating in the high resistance range, the resonant circuit is designed to operate at high voltage and high impedance.

The series resonant circuit including capacitor 7 and coil 9 of the relay is tuned to approximately 60 cycles or, alternatively, the frequency at which the alternating current is supplied through conductors 1 and 2. The circuit is most precisely tuned—closest to theoretical resonance—when the armature 10 of the relay is pulled into closed position against the core of the relay so that the inductance of the relay is at a maximum. By employing a series resonant circuit, the voltage appearing at the point 30, and applied to photocell 16, may approach and reach or even exceed full line voltage. This means that photocell 16 functions as a high resistance device and operates in the area of point A of curve 29 where small variations in incident light result in large changes in resistance. The source voltage and source impedance as detected by the photocell 16 are considerably higher than would be the case if the photocell were placed in a series circuit with the relay coil and operated at low voltage. By way of example, when operating from a 120 volt A.C. current supply, the circuit components may have values approximately as follows:

Capacitor 7 _____ .04 mfd.
Relay coil 9 _____ 180 henrys.
Photocell 16 _____ 100 ohms minimum, 10,000,000 ohms maximum.

Manifestly, the operating characteristics and parameters of the circuit may vary in accordance with the voltage requirements of any particular installation.

Operation of the photoelectric controller will now be described with particular reference to FIG. 1 in which the relays 8 and 17 are shown in their normal deenergized condition with the photocell 16 exposed to daylight so that the load 6, such as a street lighting system, is deenergized. Under daylight conditions the resistance of photocell 16 is very low, on the order of approximately 100 ohms, so that a large part of the current flowing in the resonant circuit comprising capacitor 7 and coil 9 is shunted around the high impedance coil of the relay. Relay 8 remains in a deenergized position.

As darkness approaches, the incident light on photocell 16 is reduced and the resistance of photocell increases, until it reaches a value of approximately 100,000 ohms. At this point current flowing in coil 9 increases by an amount sufficient to pick up the armature 10 so that relay 8 operates to close its normally open contact 14. This energizes the heater 25 in the power relay 17 through an electrical circuit extending from neutral supply line 1, conductor 15, armature 10, contacts 12 and 14, resistance heater 25, stationary contact 26, movable contact 19 of relay 17, snap-action spring 18, and conductor 28 to the other current supply line 2. Heater 25 does not immediately operate relay 17 and may be designed to give any predetermined time delay. In this case, about a 20 second time delay is desired.

During the heating period a stress is built up in the adjacent bimetallic blade 23 which eventually overpowers the snap-action spring 18 moving the end 20 of the spring 18 to the right, in the showing of FIG. 1, to snap the spring and cause contact 19 to engage the normally open contact 27. A power circuit is thus established from current supply line 2, conductor 28, spring 18, the closed contacts 19 and 27, and conductor 4 to the street lighting load 6 and thence to the neutral supply line 1. Not only is the load energized by operation of relay 17, but the circuit to heater 25 is interrupted by opening of contacts 19 and 26 so that heater 25 is immediately deenergized. This conserves power, greatly increases the life of the heater, and assures that there is no heat build-up within the confines of the photoelectric controller. At this point with the lighting load energized, neither heater is operating because the circuit to heater 24 is disconnected by opening of contacts 12 and 13 of the sensitive control relay 8. As previously indicated, even though the bimetallic blade 23 cools down after being energized by heater 25, the snap-action spring 18 will remain in its new position with contacts 19 and 27 closed because of its bistable action. If there is any inadvertent chattering of relay 8, or if photocell 16 is saturated by a momentary flash of lightning, the relay 8 may drop out so that armature 10 closes its contact with contact 13. Although heater 24 will now be energized to reverse the position of relay 17 there will be a time delay sufficient for the sensitive relay 8 to clear and return to its original energized position.

As dawn approaches to place more incident light on photocell 16 the very high resistance of the cell acquired during total darkness drops to approximately 80,000 ohms at which point a sufficient portion of the current flowing in the resonant circuit is shunted through the photocell 16 around coil 9 so that relay 8 drops out opening the electrical circuit through contact 14 and closing a circuit through contact 13. This energizes heater 24 through a circuit including the closed contacts 19 and 27. After the indicated time delay, heater 24 deflects its associated bimetallic blade 23 to move the outer end 20 of the snap-action spring 18 to the left, in the showing of FIG. 1, to return the spring to its original position. This opens the circuit through contact 27 to deenergize the lighting load. Even though contact 19 now mates with contact 26, a circuit is not completed through heater 25 because the circuit through contact 14 of the sensitive relay has been previously opened by drop-out of its armature 10.

One advantage of connecting the relays 8 and 17 in accordance with the invention is that the sensitive control relay 9 is not called upon to interrupt current by opening contacts 13 and 14 thereby greatly increasing the useful life of the relay. The reason is that once the circuit through contact 14 is closed to energize heater 25 this circuit is eventually interrupted by movement of the spring 18 of the power relay opening the circuit through contact 26. Thus when movable contact 12 leaves the contact 14 no current is flowing through the contacts. Similarly, when the circuit between contact 12 and fixed contact 13 is interrupted, contacts 19 and 27 of the power relay are already in open position so that no current is flowing in the circuit including heater 24.

Another advantage of the disclosed photoelectric controller is that the photocell 16 operates as a high impedance device in parallel with a portion of the resonant circuit. It is not required to dissipate relatively higher power such as would be the case if it were connected in series with the relay in a non-resonant circuit and operated as a low voltage, low impedance device; such operation reduces the stability of the control circuit and the sensitivity of the controller. Functioning as a high impedance device, the photocell operates in the area of point A of the curve of FIG. 5 where small changes in light level result in large variations in the resistance of the cell. Operating in the resonant circuit disclosed, the photocell 16 causes relay 8 to pick up when the resistance of the cell reaches approximately 100,000 ohms and to drop out when the resistance is reduced to approximately 80,000 ohms. This comparatively small variation in resistance at a low light level is sufficient in the resonant circuit to insure reliable operation of the sensitive relay 8.

To protect the photoelectric controller from occasional transient voltage surges, such as those induced by a lightning discharge, the controller is provided with air-gap protectors 31 and 32. When a high voltage surge occurs on supply line 2 the air-gap 32 breaks down bypassing the voltage surge around all components of the controller except a current limiting resistor 33 of approximately 20 ohms impedance. The purpose of resistor 33, which is inductively wound and encased in ceramic to tolerate full voltage surges, is to limit any follow-through current from the power line while the air in the gap 32 is still ionized. Any follow-through current persists for only a half cycle since the air gap is deionized when the alternating current of the supply line passes through zero. Air-gap 31, extending between the load line 4 and the neutral line 1, provides added protection in those instances in which the distance between the photoelectric controller and the load is such as to pick up any voltage surges occurring in the load line 4.

Figure 2:
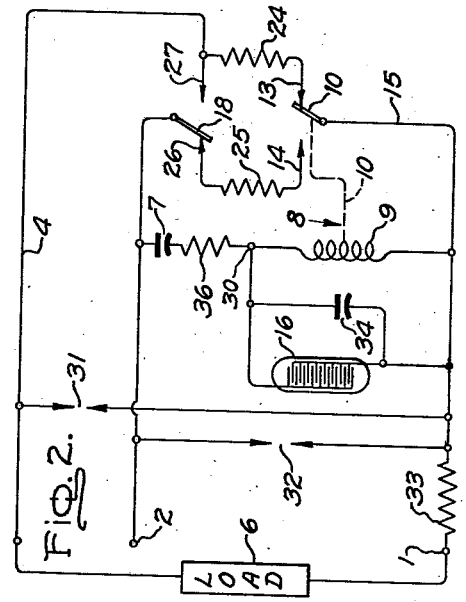
FIGS. 2, 3 and 4 are circuit diagrams illustrating variations in the photocell sensing circuit of the photoelectric controller of the invention with the time delay relay being illustrated in schematic form.

In the modification of FIG. 2, the photocell 16 is further protected from damage resulting from voltage transients in the supply lines below the 1500 to 2000 peak volts necessary to ionize the air-gap 32. This is accomplished by a filter circuit including a capacitor 34 of approximately 0.005 microfarads shunting photocell 16, and a resistor 36 of approximately 33,000 ohms resistance inserted in the resonant circuit between capacitor 7 and point 30. Voltage surges are shunted around the photocell and the sensitive relay coil. The time constant of the circuit is sufficient to provide for suppression of voltage transients but is such as not to interfere with the resonant relay circuit. In addition, resistor 36 has the beneficial effect of lowering the Q value of the resonant circuit and stabilizes the operation of the circuit in those instances in which oscillation of relay 8 may be caused by the increased inductive reactance of the circuit resulting when relay armature 10 closes.

Figure 3:
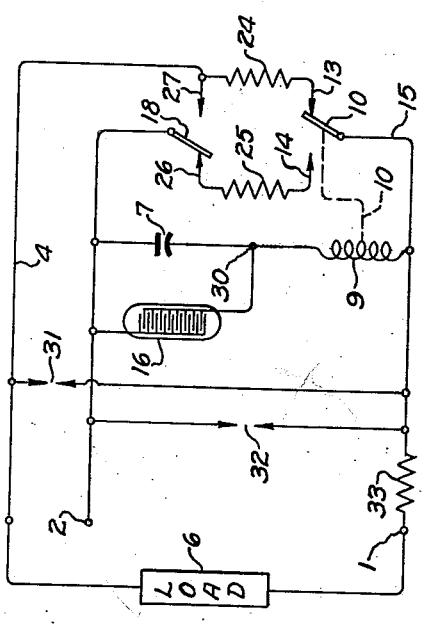

FIG. 3 illustrates a further modification in the controller electrical circuit in which photocell 16 is placed electrically in parallel with the capacitor 7 of the series resonant circuit including capacitor 7 and coil 9. Again, variations in the resistance of photocell 16 caused by changes in light levels vary the impedance of the resonant circuit so that relay coil 9 is energized and deenergized depending on light levels. The modification of FIG. 3 supplies added circuit protection for the photocell 16 due to the shunting effect of the capacitor 7. As previously mentioned, the voltage at point 30 may exceed line voltage in the resonant circuit established by capacitor 7 and coil 9 and this effect is made use of in the circuit of FIG. 3. The values of capacitor 7 and coil 9 are chosen to provide a resonant circuit having sufficiently low losses as to permit the voltage at point 30 to reach a value approximately twice line voltage when the photocell has an extremely high resistance, as in total darkness. Under such conditions the voltage applied to the relay coil 9 will have been more than sufficient to energize the relay and pick up the armature 10.

As dawn approaches to place more incident light on photocell 16, the photocell becomes more conductive and bypasses current around the capacitor thus interferes with resonance of the circuit so that voltage at point 30 drops below the value necessary to maintain relay 9 energized. Accordingly, armature 10 drops out to deenergize the load.

Figure 4:
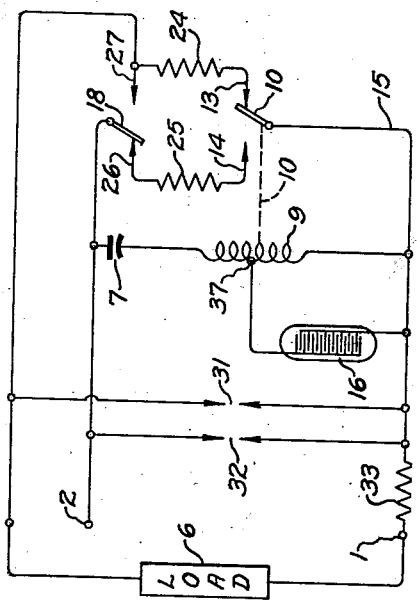

In the modified form of controller shown by FIG. 4, the photoelectric cell 16 is connected to a tap 37 on the relay actuating coil 9. Various taps may be utilized to vary the resistances of the parallel circuits including the relay coil 9 and photoelectric cell 16. The selection of the proper tap can produce a desired resistance level of operation for the photoelectric cell within its normal operating limits and thus serve as a coarse method of adjustment of the operating potential at which the photoelectric cell will trip the sensitive relay 8.

Although the photoelectric controller has been described as operating a load such as a street lighting system it should be manifest that it may be utilized to control other types of loads which are to be regulated in accordance with incident light falling on the photocell 16. In actual practice, the amount of incident light to which the photocell is exposed may be varied by blanketing part of the photocell or by varying the aperture of any device focusing light on the cell thus varying the operating light level without changing the electrical operating characteristics of the controller. Although the photocell 16 has been described as having decreasing resistance with increase in the ambient light it should be manifest that the photoelectric controller circuit will operate equally as well with a light sensitive device having other characteristics as long as the resistance changes with respect to ambient light.

While the present invention has been described with reference to particular embodiments thereof, it will be understood that numerous modifications may be made by those skilled in the art without actually departing from the invention. Therefore, I aim in the appended claims to cover all such equivalent variations as come within the true spirit and scope of the foregoing disclosure.

What I claim as new and desire to secure by Letters Patent of the United States is:

1. A photoelectric controller for connecting a load to alternating current supply lines comprising, in combination, a relay having an induction coil, a capacitor connected in series with said coil to form a resonant circuit across the supply lines, a photocell having an impedance that changes as ambient light intensities change, means connecting said photocell in parallel with one of said resonant elements so that the photocell controls the current passing through said coil to operate said relay when the ambient light intensity on the photocell changes, and means responsive to the operation of said relay to connect the load to the supply lines.

2. A photoelectric controller for connecting a load to alternating current supply lines comprising, in combination, a first relay having an induction coil, a capacitor connected in series with said coil, said coil and capacitor together forming the resonant elements of a resonant circuit across the supply lines, a photocell having an impedance that changes as ambient light intensities change, said photocell being connected in parallel with one of said resonant elements so that the photocell controls the current passing through said coil to operate said first relay when the ambient light intensity on the photocell changes, and a second time-delay relay responsive to operation of said first relay to connect and disconnect the load with the supply line.

3. A photoelectric controller for connecting a load to alternating current supply lines comprising, in combination, a first relay having an induction coil, a capacitor connected in series with said coil, said coil and capacitor together forming the resonant elements in a resonant circiut across the supply lines, a photocell having an impedance that changes as ambient light intensities change, means connecting said photocell in parallel with one of said resonant elements so that the photocell controls the current passing through said coil to operate said first relay when the ambient light intensity on the photocell changes, a second relay having means including a bistable contact element for connecting and disconnecting the load with the supply lines, and heater means in said second relay responsive to operation of said first relay to move said bistable contact to either of its two positions.

4. A photoelectric controller for connecting a load to alternating current supply lines comprising, in combination, a first relay having normally opened and closed contacts and means including an induction coil for controlling the circuit through said contacts, a capacitor connected in series with said coil to form a resonant circuit across the supply lines, a photocell having an impedance that changes as ambient light intensities change, said photocell being connected in parallel with a portion of said resonant circuit so that the photocell controls the current passing through said coil to operate said first relay when the ambient light intensity changes, a second relay having spaced contacts and heat responsive means including a bistable contact element for controlling the electrical circuit through the contacts of said relay to connect and disconnect the load to the supply lines, and separate heater elements electrically connected between the contacts of said first and second relays to operate said heat responsive means.

5. A photoelectric controller for connecting a load to alternating current supply lines comprising, in combination, a first relay having normally open and closed contacts and means including an induction coil for controlling the circuit through said contacts, a capacitor connected in series with said coil to form a resonant circuit across the supply lines, a photocell having an impedance that changes as ambient light intensities change, said photocell being connected electrically in parallel with said induction coil so that the photocell controls the current passing through said coil to operate said first relay when the ambient light intensity changes, a second relay having spaced contacts and heat responsive means including a bistable contact element for controlling the circuit through the contacts of said second relay, to connect and disconnect the load to the supply lines, and separate heater elements for operating said heat responsive means, one of said heater elements being electrically connected between the normally open contact of said first relay and a contact of said second relay, the other heater element being electrically connected between the normally closed contact of said first relay and the other contact of said second relay.

6. A photoelectric controller for connecting a load to alternating current supply lines comprising, in combination, a first relay having an induction coil, a capacitor connected in series with said coil to form a resonant circuit across the supply lines, a photocell having an impedance that decreases as the intensity of light on the photocell increases, said photocell being electrically connected in parallel with said coil so that the photocell controls the current passing through said coil to operate said relay when the light on the photocell changes, and a second time-delay relay responsive to operation of said first relay to connect and disconnect the load with the supply lines.

7. A photoelectric controller for connecting a load to alternating current supply lines comprising, in combination, a first relay having an induction coil, a capacitor connected in series with said coil to form a resonant circuit across the supply lines, a photocell having an impedance that changes as ambient light intensities change, said photocell being connected in parallel with said capacitor to control the current passing through said coil to operate said first relay when the ambient light intensity changes, and a second time-delay relay responsive to operation of said first relay to connect and disconnect the load with the supply lines.

8. A photoelectric controller for connecting a load to alternating current supply lines comprising, in combination, a time-delay relay for energizing the load from the supply lines, said time-delay relay having spaced contacts and heat responsive means including a movable bistable contact element for engaging either of said spaced contacts, separate heater elements electrically connected to said spaced contacts for operating said heat responsive means to move the bistable contact element upon energization of either heater, a second relay having spaced contacts electrically connected to said heater elements and an armature for opening and closing an electrical circuit to either contact of the second relay to energize either of said heaters, the circuit to said energized heater being interrupted upon operation of said bistable contact element, said second relay being provided with an induction coil for moving said armature, and photoelectric means for energizing said induction coil in response to changes in light levels.

9. A photoelectric controller for connecting a load to alternating current supply lines comprising, in combination, a time-delay relay for energizing the load from the supply lines, said time-delay relay having spaced contacts and heat responsive means including a movable bistable contact element for engaging either of said spaced contacts, separate heater elements electrically connected to said spaced contacts for operating said heat responsive means to move the bistable contact element upon energization of either heater, a second relay having spaced contacts electrically connected to said heater elements and an armature for opening and closing an electrical circuit to either contact of the second relay to energize either of said heaters, the circuit to said energized heater being interrupted upon operation of said bistable contact element, said second relay being provided with an induction coil for moving said armature, a capacitor connected in series with said coil across the supply lines to form a resonant circuit and a photocell connected in parallel with a portion of said resonant circuit to control energization of said induction coil in response to changes in light levels.

References Cited in the file of this patent

UNITED STATES PATENTS

| | | |
|---|---|---|
| 2,141,942 | Suits | Dec. 27, 1938 |
| 2,202,060 | Mitchell | May 28, 1940 |